United States Patent
Furuta et al.

(10) Patent No.: US 6,621,771 B1
(45) Date of Patent: Sep. 16, 2003

(54) DISK DRIVE WITH AN OBJECTIVE LENS DISPOSED IN AN OPTICAL HEAD MOVING ALONG A TRANSFER LINE NOT INTERSECTING THE CENTER OF ROTATION OF A DISK

(75) Inventors: Kenji Furuta, Kanagawa-ken (JP); Shoichi Kyoya, Miyagi-ken (JP); Tatsumaro Yamashita, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/503,766

(22) Filed: Feb. 14, 2000

(30) Foreign Application Priority Data

Feb. 19, 1999 (JP) ............................................ 11-040962

(51) Int. Cl.[7] ................................................ G11B 7/00
(52) U.S. Cl. ................................ 369/44.16; 369/44.23; 369/44.29; 369/44.37; 369/244
(58) Field of Search ........................... 369/44.14, 44.15, 369/44.16, 44.23, 44.37, 44.29, 244

(56) References Cited

U.S. PATENT DOCUMENTS

| | | | |
|---|---|---|---|
| 4,436,389 A | * 3/1984 | Sano ........................... 351/208 |
| 4,773,062 A | * 9/1988 | Wada et al. .................... 369/44 |
| 4,861,144 A | * 8/1989 | Russell ........................ 350/412 |
| 5,153,865 A | * 10/1992 | Minakuchi ................. 369/44.28 |
| 5,463,501 A | * 10/1995 | Suzuki ........................ 359/814 |
| 5,754,504 A | * 5/1998 | Yamazaki et al. ....... 369/44.23 |
| 5,835,475 A | * 11/1998 | Kawakami et al. ......... 369/112 |
| 6,181,667 B1 | * 1/2001 | Mori et al. ................. 369/112 |

FOREIGN PATENT DOCUMENTS

| | | |
|---|---|---|
| JP | 9-17155 | 1/1997 |
| JP | 9-17156 | 1/1997 |
| JP | 9-17157 | 1/1997 |
| JP | 10-21570 | 1/1998 |

* cited by examiner

*Primary Examiner*—Doris H. To
*Assistant Examiner*—Gautam R. Patel
(74) *Attorney, Agent, or Firm*—Brinks Hofer Gilson & Lione

(57) ABSTRACT

A disk drive includes a DVD optical head and a CD optical head. An objective lens in the CD optical head moves along a reference radial line passing through the center of rotation of an optical disk. An objective lens in the DVD optical head moves along a transfer line parallel to the reference radial line, and is disposed so that an expression $R0<(Rmin+Rmax)/2$ is satisfied, where Rmin and Rmax represent distances along the reference radial line between the center of rotation and the positions of the objective lens when it is disposed on the innermost and outermost tracks of the optical disk, respectively, and R0 represents a distance along the reference radial line between the center of rotation and the position of the objective lens when its tracking correction direction is towards the center of rotation of the optical disk.

5 Claims, 3 Drawing Sheets

DISK DRIVE WITH AN OBJECTIVE LENS DISPOSED IN AN OPTICAL HEAD MOVING ALONG A TRANSFER LINE NOT INTERSECTING THE CENTER OF ROTATION OF A DISK

BACKGROUND OF THE INVENTION

1. Field of the Invention

The present invention relates to disk drives including optical heads for use with optical disks of different specifications. In particular, the invention relates to a disk drive having an optical head disposed in a position in which tracking can be corrected.

2. Description of the Related Art

Disk drives which can read to and write from media such as compact disks (herein referred to as CD) and digital versatile disks (herein referred to as DVD) are known, which are used as devices such as peripheral devices of computers. Various types of disk drives are widely used for read-only media such as CD-ROM and DVD-ROM, and for read-and-write media such as CD-R, CD-RW, and DVD-R. Optical disks used in such disk drives have substantially the same inner and outer diameters.

In a known disk drive, an optical head is used for reading data, and tracking correction servo and focus correction servo are performed while a center of an objective lens provided in the optical head moves along a radial line of a disk. The tracking correction servo is performed by slightly moving the lens along a direction parallel to the surface of the disk, and the focus correction servo is performed by slightly moving the lens along a direction perpendicular to the surface of the disk.

A disk drive which is commonly used for different types of media such as CD and DVD must be provided with optical heads corresponding to each of the media, as the media have different structural specifications, etc.

A known disk drive of the above-described type is disclosed, for example, in Japanese Unexamined Patent Application Publication Nos. 9-17156 and 9-17157 (herein referred to as (A)), in which different optical pickups (optical heads) are provided in positions symmetrical with respect to the center of rotation of the disk, the center of each of the optical pickups moving along a radial line of the disk.

Another known disk drive is disclosed in Japanese Unexamined Patent Application Publication Nos. 9-17155 and 10-21570 (herein referred to as (B)), in which a plurality of optical heads (optical pickups) of different specifications are disposed adjacent to each other, and their positions are selectively changed so that a center of an objective lens of the selected optical head can move along a radial line of the disk.

In the disk drive, tracking correction servo is performed in which a tracking error signal is detected by laser beams applied to the disk, wherein the objective lens must be moved along a radial line of the disk, as described in (A) and (B) above.

In the disk drive disclosed in (A) above, a problem has been found in that the design options are limited because the optical heads must be disposed at both sides of the center of rotation of the disk, and spaces are required for the movement of each optical head, the optical heads being disposed so that centers of objective lenses thereof can move along radial lines of the disk. Regarding miniaturization, the disk drive disclosed in (B) above is superior to the disk drive described in (A) above. However, the problem is that the structure and the circuitry of the optical heads are complex because a mechanism for selectively changing the objective lenses must be provided, and the overall cost may be high due to the development cost of optical system of both optical heads.

SUMMARY OF THE INVENTION

Accordingly, it is an object of the present invention to provide a disk drive in which an optical head can be disposed free from the design restriction that a center of an objective lens must move only along a radial line of the disk.

According to an aspect of the present invention, a disk drive is provided which comprises a rotational-driving mechanism for rotating a disk; an optical head including a tracking correction mechanism for slightly driving an objective lens along a direction crossing recording tracks on the disk; and an optical head transferring mechanism for transferring the optical head in a manner such that the optical axis of the objective lens moves along a transfer line separated by a distance L from a reference radial line extending from the center of rotation of the disk rotated by the rotational-driving mechanism, the transfer line being parallel to the reference radial line. In the disk drive, the distance L and the tracking correction direction of the objective lens driven by the tracking correction mechanism are set so that an expression R0<(Rmin+Rmax)/2 is satisfied, in which Rmin represents a distance between the center of rotation of the disk and the optical axis of the objective lens, the distance being reduced to a distance along the reference radial line, when the objective lens is positioned on the innermost track of the disk, Rmax represents a distance between the center of rotation of the disk and the optical axis of the objective lens, the distance being reduced to a distance along the reference radial line, when the objective lens is positioned on the outermost track of the disk, and R0 represents a distance between the center of rotation of the disk and the optical axis of the objective lens, the distance being reduced to a distance along the reference radial line, when the objective lens is positioned on a track between the innermost track and the outermost track. The tracking correction direction is a direction of the radial line between the optical axis of the objective lens and the center of rotation of the disk.

According to the present invention, tracking servo is enabled in an optical head in which the optical axis of the objective lens does not move along a radial line of the disk, and the effect of offset is minimized by computing and setting the distance L and the tracking correction direction to satisfy the expression above. The optical head is not necessarily designed so that the optical axis of the objective lens moves along a radial line of the disk. The structure of the optical head is not complex because mechanisms for selectively changing optical heads are not required, thereby lowering the manufacturing cost.

When optical heads to be applied to two disks of different types of specifications are movably provided for reading from the two disks, an objective lens of a first optical head is disposed so that the optical axis thereof moves along a radial line of the disk between the innermost track and the outermost track, and an objective lens of a second optical head is disposed so that the second optical head is inclined toward the center of rotation of the disk with respect to the radial line of the disk. The optical axis of the objective lens of the second optical head moves along a line separated by a predetermined distance from the optical axis of the objective lens of the first optical head, in parallel to a line along which the optical axis of the objective lens of the first optical head moves, the objective lens of the second optical head moving between the innermost track and the outermost track. In this case, the line along which the optical axis of the objective lens of the first optical head moves is referred to as a reference radial line.

According to the invention, only the second optical head described above may be provided in the disk drive. In the second optical head, the optical axis of the objective lens thereof is not necessarily transferred along the reference radial line, whereby flexible design options are ensured, and a controlling operation is not required for applying the optical axis of the objective lens to the reference radial line.

The distance between the center of rotation of the disk and the optical axis of the objective lens of the second optical head, which is disposed to be inclined, is reduced to a distance along a direction parallel to the reference radial line from the center of rotation of the disk. That is, the distance on the optical axis is indicated as a distance between the center of rotation of the disk and an intersection of the reference radial line with a perpendicular thereto from the optical axis of the second objective lens. With the above-described reduction to the distances along the reference radial line of the disk, the distance of the optical axis of the objective lens of the second optical head is represented by Rmin when the optical axis is positioned on the innermost track, the distance of the optical axis of the objective lens of the second optical head is represented by Rmax when the optical axis is positioned on the outermost track, and the distance of the optical axis of the objective lens of the second optical head is represented by R0 when the optical axis is positioned on a track between the innermost track and the outermost track. The tracking correction direction is a direction along a radial line between the center of rotation of the disk and the optical axis of the objective lens of the second optical head.

The tracking correction direction and the distance of the optical axis of the objective lens of the second optical head are set to satisfy the expression R0<(Rmin+Rmax)/2 which is a relational expression of Rmin, Rmax, and R0.

In the disk drive according to the present invention, the tracking correction direction (inclination of the optical head) may be determined so that an expression θ1=θ2 is satisfied, in which θ1 represents an absolute value of a first offset angle when the optical axis of the objective lens is on the innermost track and θ2 represents an absolute value of a second offset angle when the optical axis of the objective lens is on the outermost track, the offset angle being an angle between a radial line connecting the optical axis of the objective lens on a track to the center of rotation of the disk and the tracking correction direction.

In the disk drive according to the invention, each of the offset angles θ1 and θ2 may be no greater then a permissible offset angle of tracking correction direction of the optical head.

By setting angles θ1 and θ2 to values substantially satisfying the expression θ1=θ2, the tracking performance deterioration on the innermost track and the tracking performance deterioration on the outermost track of the disk can be minimal. In this case, the values of angles θ1 and θ2 are absolute values. When θ1<θ2, the tracking performance deterioration at the angle θ1, that is, on the innermost track, is less than the above value when θ1=θ2. However, the tracking performance deterioration at the angle θ2, that is, on the outermost track, is greater than the above value when θ1=θ2, thereby reducing the tracking performance and disabling tracking correction.

According to another aspect of the present invention, a disk drive is provided which comprises a rotational-driving mechanism for rotating a disk; a first optical head and a second optical head each including a tracking correction mechanism for slightly driving an objective lens along a direction crossing recording tracks on the disk; and an optical head transferring mechanism for transferring the first optical head and the second optical head in a manner such that the optical axis of the objective lens of the first optical head moves along a transfer line separated by a distance L from a reference radial line extending from the center of rotation of the disk rotated by the rotational-driving mechanism, the transfer line being parallel to the reference radial line, and the optical axis of the objective lens of the second optical head moves along the reference radial line. In the first optical head, the distance L and the tracking correction direction of the objective lens driven by the tracking correction mechanism are set so that an expression R0<(Rmin+Rmax)/2 is satisfied, in which Rmin represents a distance between the center of rotation of the disk and the optical axis of said objective lens, the distance being reduced to a distance along the reference radial line, when the objective lens is positioned on the innermost track of the disk, Rmax represents a distance between the center of rotation of the disk and the optical axis of the objective lens, the distance being reduced to a distance along the reference radial line, when the objective lens is positioned on the outermost track of the disk, and R0 represents a distance between the center of rotation of the disk and the optical axis of the objective lens, the distance being reduced to a distance along the reference radial line, when the objective lens is positioned on a track between the innermost track and the outermost track, and in which the tracking correction direction is a direction of the radial line between the optical axis of the objective lens and the center of rotation of the disk. In the second optical head, the tracking correction direction of the objective lens is set in the same direction as that of the reference radial line.

When two types of the optical heads of different specifications are provided as described above, the two optical heads are not necessarily disposed to flank the center of rotation of the disk so as to move along radial lines of the disk, or are not necessarily selectively changed to be used, as in a known disk drive, whereby flexible design options are provided. The wide design options are also provided in view of the fact that optical heads of different specifications can be developed independently from each other to be mounted in a disk drive.

According to the present invention, tracking correction in the second optical head is preferably performed by a three-beam method, and tracking correction in the first optical head, in which the tracking correction direction (inclination of the optical head) is set, is preferably performed by a method other than the three-beam method.

For example, a tracking correction method having a higher permissible offset angle than a three-beam method, such as a phase-differential method, may be used in an optical head for which tracking direction is offset, and a three-beam method may be used for tracking correction in the other optical head which moves along the reference radial line. The three-beam method which has a lower permissible offset angle is used in the optical head which moves along the reference radial line of the disk, thereby suppressing the effects of the offset.

The present invention is not applicable only to a disk having two different types of optical heads, but it is applicable also to a disk drive which has more than two types of optical heads, or to a disk having only one optical head.

DESCRIPTION OF THE PREFERRED EMBODIMENT

A disk drive according to the present invention is described below with reference to the drawings.

Figure 1:
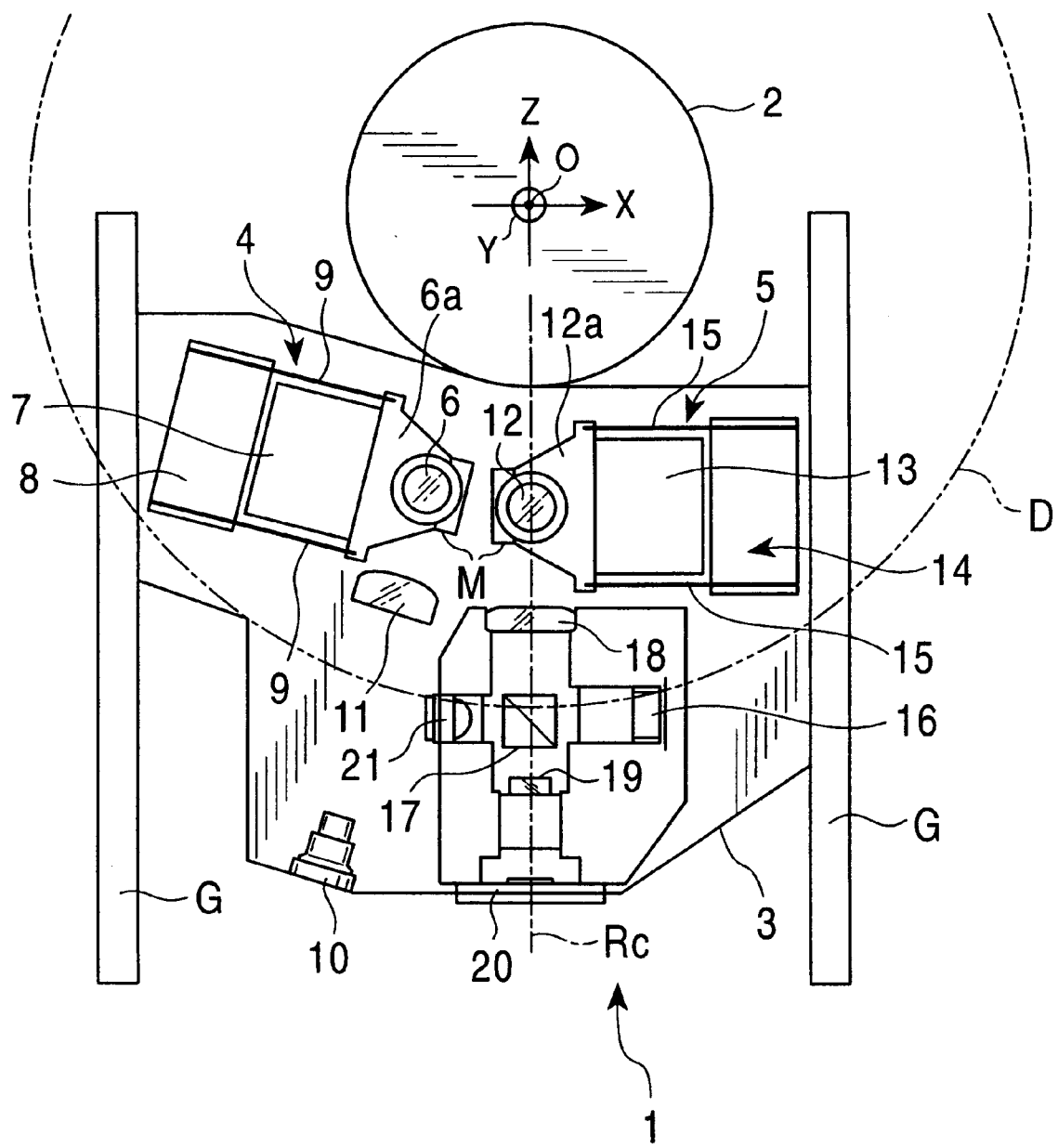
FIG. 1 is a plan view of an optical head of a disk drive according to the present invention.
Figure 2:
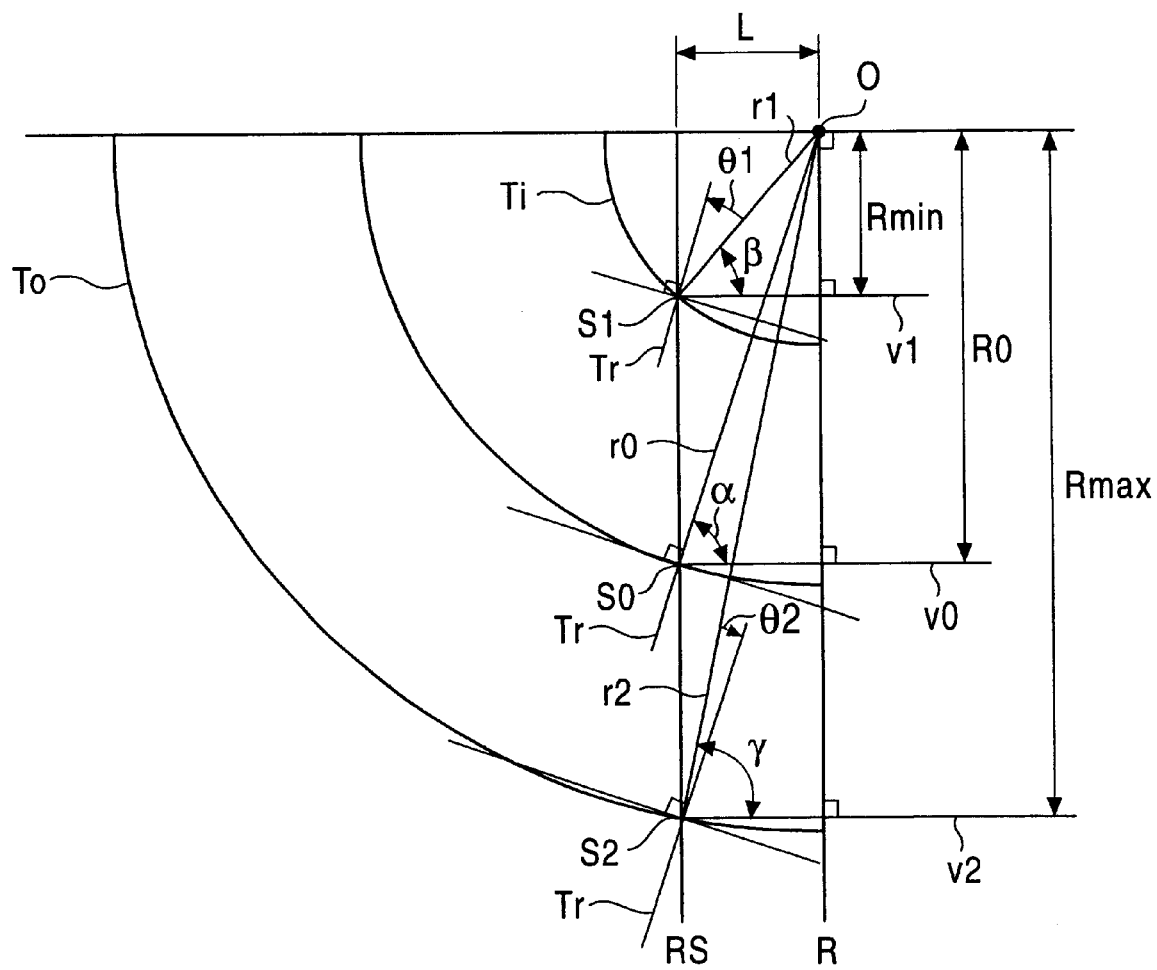
FIG. 2 is an illustration for computation of the placement of the optical head which is inclined with respect to a radial line of the disk to be used in the disk drive according to the invention.
Figure 3:
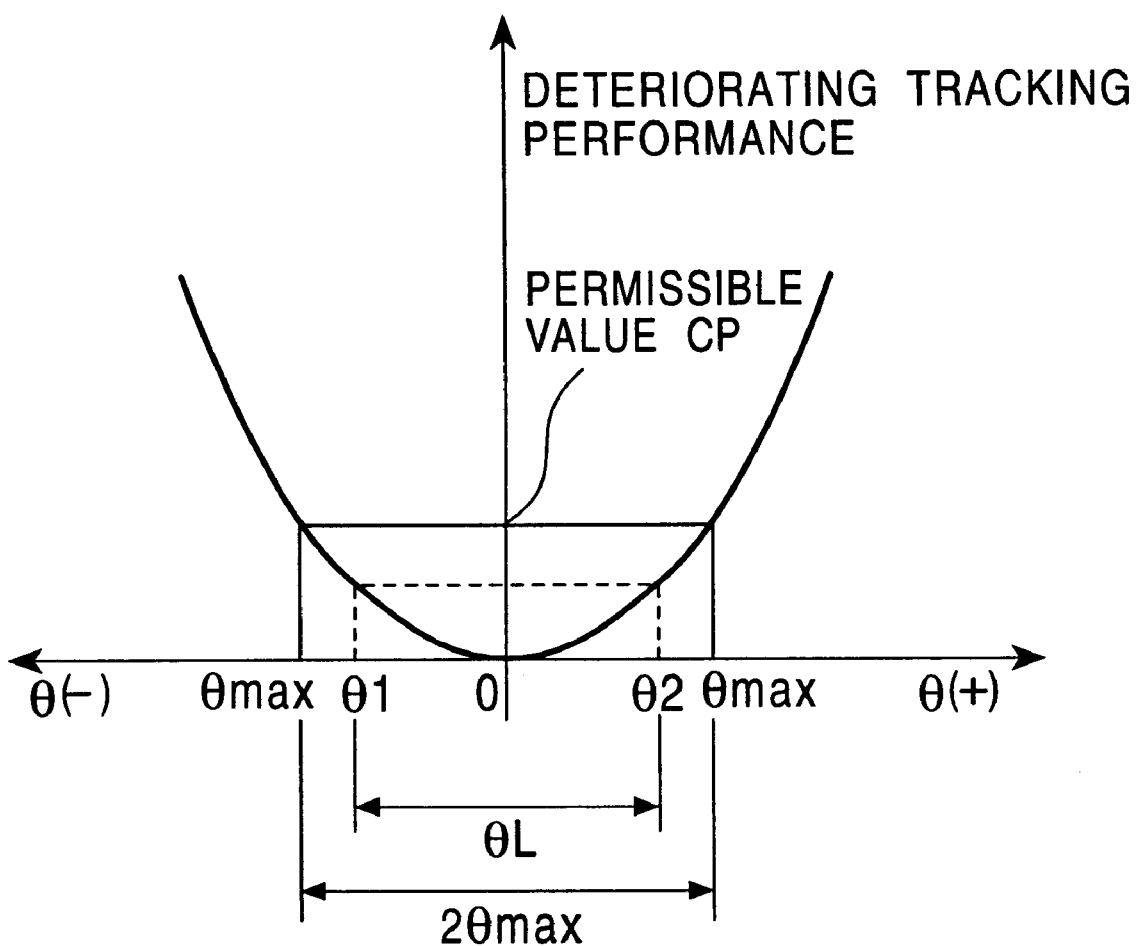
FIG. 3 is a graph showing a permissible value of offset angles of the optical head used in the disk drive according to the invention.

FIG. 1 is a plan view showing the structure of an optical head of a disk drive according to the invention. FIG. 2 is an illustration by which the placement of the optical head inclined with respect to the radial line of the disk is computed. FIG. 3 is a graph showing the permissible offset angle.

An example of the disk drive which includes an optical head for CD and another optical head for DVD is described below. The CD optical head serves for a read-only medium such as a CD-ROM and for read-and-write media such as a CD-R (CD-Recordable) and a CD-RW (CD-ReWritable). The DVD optical head serves for a read-only medium such as a DVD-ROM and for a read-and-write medium such as a DVD-R. The optical heads for these media are appropriately combined to configure the disk drive.

In FIG. 1, an optical head device 1 is shown, which includes a DVD optical head 4 and a CD optical head 5 on a carriage 3. The carriage 3 is supported by guides G at two sides thereof. The guides G are fixed on a chassis frame of the optical head 1. The chassis frame is provided with a driving unit such as a motor (thread-driven mechanism) for moving the carriage 3 along the radial direction of a disk D. The optical heads 4 and 5 provided on the carriage 3 move, in combination with each other, between the inner diameter and the outer diameter of the optical disk D.

A turntable 2, serving as a rotational-driving unit, for receiving the optical disk D is provided adjacent to the optical head device 1. Generally known mechanisms are applied to components, such as a spindle motor for rotating the optical disk D on the turntable 2, and the driving unit (thread-driven mechanism) for moving the optical head device 1 along the radial direction of the disk.

The optical head 4 is actuated when a DVD is inserted into the disk drive and placed on the turntable 2, and the optical head 5 is actuated when a CD is inserted into the disk drive and placed on the turntable 2.

The DVD optical head 4 includes an objective lens 6, a correction-driving unit 7, a supporting unit 8, wires 9 as elastic supporting members, a compound device 10, a collimator lens 11, and a mirror M.

The objective lens 6 is elastically supported in a cantilever fashion by the supporting unit 8 through four wires 9, two wires 9 being provided at each side of the correction-driving unit 7.

The correction-driving unit 7 is provided with a coil and a magnet for tracking-correction servo which moves the objective lens 6 along the tracking direction (Z-axis direction), and a coil and a magnet for focus-correction servo which moves the objective lens 6 along the focusing direction (Y-axis direction). The coils for tracking-correction servo and focus-correction servo are fixed to the carriage 3 together with the supporting unit 8. The magnets are fixed to a lens holder 6a which supports the objective lens 6.

The compound device 10 serves as a light emitting device and a photo-detecting device, and includes a light emitting element such as a semiconductor laser, a photo-detecting element such as a pin photodiode, a light receiving lens, and so on.

The collimator lens 11 converts laser beams from the compound device 10 into parallel rays. The mirror M (a portion thereof is shown in FIG. 1) including a prism and a mirror is provided at the lower part of the objective lens 6. The mirror M is disposed between the objective lens 6 and the collimator lens 11, for reflecting the beams toward the objective lens 6 and the collimator lens 11.

Laser beams applied by the compound device 10 to the collimator lens 11 are converted into parallel rays by the collimator lens 11 and are reflected toward the objective lens 6 by the mirror M provided at the lower part of the objective lens 6. The laser beams are focused by the objective lens 6 to be applied to the pits of tracks provided on the recording layer of the optical disk D. The laser beams reflected by the optical disk D return to the compound device 10 through the objective lens 6, the mirror M, and the collimator lens 11.

In the DVD optical head 4, tracking is corrected by a phase-differential method. A correction current is applied to the coil for tracking-correction servo according to the phase difference detected in the compound device 10, thereby driving the lens holder 6a and the objective lens 6 along a tracking correction direction. The coil for focus-correction servo is activated according to the focus-error signal detected in the compound device 10, thereby driving the objective lens 6 along a focus correction direction.

The CD optical head 5 includes an objective lens 12, a correction-driving unit 13, a supporting unit 14, wires 15 for elastically supporting, in a cantilever fashion, a lens holder 12a for holding the objective lens 12, a light emitting device 16, a beam splitter 17, a collimator lens 18, a light receiving lens 19, a photo-detecting device 20, a monitoring device 21, and another mirror M. The objective lens 12, the correction-driving unit 13, the supporting unit 14, and the wires 15 are disposed substantially in the same manner as in the DVD optical head 4.

The light emitting device 16 includes a semiconductor laser. Laser beams from the light emitting device 16 are applied to the beam splitter 17, and are reflected toward the collimator lens 18. The intensity of the laser beams from the light emitting device 16 is monitored by the monitoring device 21 to be controlled. The laser beams which the collimator lens 18 transmits are reflected by the mirror M toward the objective lens 12. The objective lens 12 focuses the laser beams on the pits of tracks of the disk. The laser beams reflected by the optical disk D are again reflected by the mirror M and are transmitted through the collimator lens 18. The returning laser beams are linearly transmitted through the beam splitter 17 without being reflected thereby, are applied to the light receiving lens 19, and are detected by the photo-detecting device 20. According to the detected laser beams incident on the photo-detecting device 20, signals recorded on the optical disk D and the amount of focusing error and tracking error are detected.

In the CD optical head 5, tracking is corrected by a three-beam method. Laser beams from the light emitting device 16 are applied to the recording surface of the optical disk D to form three spots thereon. Tracking error signals are obtained by detecting signals from the laser beams reflected from the intermediate spot of the three aligned spots and by sensing the difference of the intensity of the laser beams reflected from the spots.

As shown in FIG. 1, the optical head device 1 mounted in the disk drive according to the present invention moves in such a manner that a center of the objective lens 12 of the CD optical head 5 moves along a radial line Rc of the optical disk D while a center of the objective lens 6 of the DVD optical head 4 is disposed to deviate from the radial line Rc since the DVD optical head 4 is slightly inclined with respect to the CD optical head 5. The center of the objective lens 6 of the DVD optical head 4 moves along a line offset from the radial line Rc, in which tracking errors are detected by a phase-differential method or the like which has a high tolerance to angular offset, while the center of the objective lens 12 of the CD optical head 5 moves along the radial line Rc, in which tracking errors are detected by the three-beam method which has a lower tolerance to angular offset.

The relationship between the position of the DVD optical head 4 and the CD optical head 5 is described as follows with reference to FIG. 2 and FIG. 3.

FIG. 2 shows a section of the optical disk D which includes an innermost track Ti and an outermost track To of the recording region of the optical disk D. A center (optical axis) of the objective lens 12 of the CD optical head 5 moves between the inner diameter and the outer diameter of the optical disk D along a reference radial line R extending from a center O of the optical disk D, and a center (optical axis) of the objective lens 6 of the DVD optical head 4 moves between the inner diameter and the outer diameter of the optical disk D along a transfer line Rs parallel to the reference radial line R. The distance between the optical axes of the objective lens 12 and the objective lens 6, that is the distance between the reference radial line R and the transfer line Rs, is indicated by L.

When the line between the optical axis of the objective lens 6 and the optical disk center O is on a radial line Tr, the angle between the radial line Tr and a perpendicular v0 to the reference radial line R is indicated by a, and the intersection of the radial line Tr with the perpendicular v0 is indicated by S0. The distance between the center O of the optical disk and the intersection of the reference radial line R with the perpendicular v0 is indicated by R0.

When the optical axis of the objective lens 6 is on the innermost track Ti, the optical axis of the objective lens 6 is represented by Si. The angle between a radial line r1 from the center O of the optical disk to the optical axis S1 and a perpendicular v1 to the reference radial line R from the optical axis S1 is represented by β. The distance between the center O of the optical disk and the intersection of the reference radial line R with the perpendicular v1 is represented by Rmin. When tracking correction is performed by the objective lens 6 having the optical axis S1 along the radial line Tr, the angle between the radial line r1 and the radial line Tr, which is the tracking correction direction, is represented by θ1. The angle θ1 is an offset angle of tracking correction when the objective lens 6 is positioned at the innermost track.

When the center (optical axis) of the objective lens 6 is on the outermost track To, the optical axis of the objective lens 6 is represented by S2. The angle between a radial line r2 extending from the optical axis S2 to the center O of the optical disk and a perpendicular v2 to the reference radial line R from the optical axis S2 is represented by γ. The distance between the center O of the optical disk and the intersection of the reference radial line R with the perpendicular v2 is represented by Rmax. The angle between the radial line Tr which is the tracking correction direction and the radial line r2 is represented by θ2. The angle θ2 is an offset angle of the tracking correction when the optical axis S2 of the objective lens 6 is positioned at the outermost track To.

When the tracking correction direction Tr of the objective lens 6 is a direction along the radial line r0 connecting the optical axis of the objective lens 6 with the center O of the optical disk, that is, when the tracking correction direction is not offset from the radial line r0, the optical axis of the objective lens 6 is represented by S0. The distance between the center O of the optical disk and the intersection of the perpendicular v0 with the reference radial line R is represented by $R_0$.

When the parameters described above are set as follows, the absolute values of the offset angles θ1 and θ2 can be minimized.

FIG. 3 shows the relationship between an offset angle θ of tracking correction and the tracking performance. The offset angle θ is positive (+) when the angle is formed clockwise with respect to the line between the center O of the optical disk and the optical axis of the objective lens 6, as shown in FIG. 2, and is negative (−) when the angle is formed counterclockwise with respect to the same line, as shown in FIG. 2.

As shown in FIG. 3, when the absolute value of the offset angle increases, tracking correction performance deteriorates. The tracking cannot be corrected when the offset angle is excessively large. The permissible offset angles are represented by ±θmax when the deterioration of the tracking performance of the optical head 4 has a permissible value shown in FIG. 3.

In FIG. 2, the difference between the offset angle θ2 formed at the positive side and the offset angle θ1 formed at the negative side (a sum of the absolute offset-angle values) which is expressed by θ2−θ1=θL is geometrically determined based on the radial distance between the innermost track Ti and the outermost track To (difference of the radii) and the distance L between the transfer line Rs and the reference radial line R. In FIG. 3, when the line of the sum θL of the absolute offset-angle values shifts to the right, the offset angle θ2 may exceed the permissible offset angle +θmax, and when the line of the sum θL of the offset angles shifts to the left, the offset angle θ1 may exceed the permissible offset angle −θmax.

In FIG. 3, the middle point of line θL is most preferably positioned at the middle point 0 of the horizontal axis, at which the absolute value of the offset angle θ1 equals the absolute value of the offset angle θ2. In this case, the largest offset angle equals the absolute value of the offset angle θ1 and equals the absolute value of the offset angle θ2. The sum θL can be expanded to a permissible offset-angle range 2θmax between the permissible offset angles ±θmax. High tracking performance of the optical head 4 can be obtained over a wide range, thereby allowing fewer design restrictions of the tracking performance.

The absolute offset-angle value θ1 can be equalized with the absolute offset-angle value θ2 only when the following expression is satisfied.

$$R0 < (Rmin + Rmax)/2 \qquad (1)$$

At least the expression above must be satisfied so that the absolute value of the largest offset angle is reduced. Preferably, expression θ1=θ2 is satisfied.

Computation of the placement of the optical head 4 when $\theta 1=\theta 2$ is described as follows.

In FIG. 2, $\tan \alpha$, $\tan \beta$, and $\tan \gamma$ are given by the following expression.

$$\tan \alpha = (R0/L)$$
$$\tan \beta = (Rmin/L)$$
$$\tan \gamma = (Rmax/L) \quad (2)$$

The offset angle $\theta 1$ is given by $\alpha-\beta$, and the offset angle $\theta 2$ is given by $\gamma-\alpha$. Therefore, the following expressions are obtained.

$$\theta 1 = \alpha - \beta = \tan^{-1}(R0/L) - \tan^{-1}(Rmin/L) \theta 2 = \gamma - \alpha = \tan^{-1}(Rmax/L) - \tan^{-1}(R0/L) \quad (3)$$

Therefore, when $\theta 1=\theta 2$ (=$\theta 0$), the following expression is obtained.

$$\tan^{-1}(R/L) - \tan^{-1}(Rmin/L) = \tan^{-1}(Rmax/L) - \tan^{-1}(R0/L) = \theta 0 \quad (4)$$

The expressions above are reduced to the following expression.

$$\tan^{-1}(Rmax/L) - \tan^{-1}(Rmin/L) = 2\theta 0 \quad (5)$$

The expression (5) above is satisfied when $\theta 1=\theta 2$, that is, when the absolute value of the offset angle of the tracking correction direction when the optical axis of the objective lens 6 is positioned on the innermost track Ti equals the absolute value of the offset angle of the tracking correction direction when the optical axis of the objective lens 6 is positioned on the outermost track To.

The expression (4) is satisfied when the following expression (6) is satisfied, the expression (6) being satisfied when the expression (1) is satisfied.

$$2 \cdot \tan^{-1}(R0/L) = \tan^{-1}(Rmax/L) + \tan^{-1}(Rmin/L) \quad (6)$$

Rmax and Rmin in the expression can be obtained from the structure of the optical disk D. $\theta 0$ can be obtained by setting offset angles of the optical head in the range between the permissible offset angles $\pm\theta max$, as shown in FIG. 3.

The distance L which satisfies $\theta 1=\theta 2$ can be obtained by replacing Rmax, Rmin, and $\theta 0$ in the expression (4) by the values obtained as described above. The distance L is a distance between the optical axis of the objective lens 6 and the optical axis of the objective lens 12.

$R_0$ can be obtained from the expression (4) by replacing L, Rmax, Rmin, and $\theta 0$ by the values obtained as described above. R0 represents the distance between the center O of the optical disk and the intersection of the reference radial line R with a perpendicular thereto from the optical axis of the objective lens 6 of the optical head 4, when the offset angle is zero.

The angle $\alpha$ between the radial line Tr and the perpendicular to the reference radial line R from the optical axis S0 of the objective lens 6 can be obtained from the distances L and $R_0$, whereby the amount of inclination of the optical head, that is, the inclination of tracking correction direction of the optical head 4, can be obtained.

For example, when Rmax=60 mm, Rmin=22 mm, and $\theta 0=5°$, the distance L=8 mm and the distance R0=35 mm are obtained with the computation described above only when the expression (1) is satisfied.

The disk drive according to the present invention is not limited to that which is described in the embodiment above. The disk drive may be modified in a manner within the sprit and scope of the invention, such that the disk drive may be provided with more than two types of the optical heads, may be provided with two types of optical heads which are offset from the reference radial line, or may be provided with one optical head offset with respect to the reference radial line.

In the disk drive according to the present invention, the optical axis of an objective lens of an optical head is not necessarily transferred along the radial line of the optical disk during reading of data, etc., for tracking correction, thereby providing design options for placement of the components.

When optical heads of different specifications are provided in one disk drive, these optical heads can be mounted in the disk drive, while being designed independently of each other, whereby wide design options are ensured.

The structure of the disk drive according to the present invention is not complex because mechanisms for selectively changing optical heads are not included, thereby reducing the manufacturing cost.

What is claimed is:

1. A disk drive comprising:
   rotational-driving means for rotating a disk;
   an optical head including tracking correction means for slightly driving an objective lens along a direction crossing recording tracks on the disk; and
   optical head transferring means for transferring said optical head in a manner such that the optical axis of the objective lens moves along a transfer line separated by a distance L from a reference radial line extending from the center of rotation of the disk rotated by said rotational-driving means, the transfer line being parallel to the reference radial line;
   wherein said distance L and the tracking correction direction of the objective lens driven by said tracking correction means are set so that an expression R0< (Rmin+Rmax)/2 is satisfied, in which Rmin represents a distance between the center of rotation of said disk and the optical axis of said objective lens, the distance being reduced to a distance along the reference radial line, when the objective lens is positioned on the innermost track of the disk, Rmax represents a distance between the center of rotation of said disk and the optical axis of said objective lens, the distance being reduced to a distance along the reference radial line, when the objective lens is positioned on the outermost track of the disk, and R0 represents a distance between the center of rotation of said disk and the optical axis of said objective lens, the distance being reduced to a distance along the reference radial line, when the objective lens is positioned on a track between the innermost track and the outermost track, and in which the tracking correction direction is a direction of the radial line between the optical axis of said objective lens and the center of rotation of the disk.

2. A disk drive according to claim 1, wherein a tracking correction direction is set so that an expression $\theta 1=\theta 2$ is satisfied, in which $\theta 1$ represents an absolute value of a first offset angle when the optical axis of the objective lens is on the innermost track and $\theta 2$ represents an absolute value of a second offset angle when the optical axis of the objective is on the outermost track, each of said offset angles being angles between the radial line connecting the optical axis of the objective lens on a track to the center of rotation of the disk and said tracking correction direction.

3. A disk drive according to claim 1, wherein each of said offset angles $\theta 1$ and $\theta 2$ is no greater than a permissible offset angle of tracking correction direction of the optical head.

4. A disk drive comprising:

rotational-driving means for rotating a disk;

a first optical head and a second optical head each including tracking correction means for slightly driving an objective lens along a direction crossing recording tracks on the disk; and optical head transferring means for transferring said first optical head and said second optical head in a manner such that the optical axis of the objective lens of said first optical head moves along a transfer line separated by a distance L from a reference radial line extending from the center of rotation of the disk rotated by said rotational-driving means, the transfer line being parallel to the reference radial line, and the optical axis of the objective lens of said second optical head moves along the reference radial line;

wherein, in said first optical head, said distance L and the tracking correction direction of the objective lens driven by said tracking correction means are set so that an expression $R0<(Rmin+Rmax)/2$ is satisfied, in which Rmin represents a distance between the center of rotation of said disk and the optical axis of said objective lens, the distance being reduced to a distance along the reference radial line, when the objective lens is positioned on the innermost track of the disk, Rmax represents a distance between the center of rotation of said disk and the optical axis of said objective lens, the distance being reduced to a distance along the reference radial line, when the objective lens is positioned on the outermost track of the disk, and R0 represents a distance between the center of rotation of said disk and the optical axis of said objective lens, the distance being reduced to a distance along the reference radial line, when the objective lens is positioned on a track between the innermost track and the outermost track, and in which the tracking correction direction is a direction of the radial line between the optical axis of said objective lens and the center of rotation of the disk; and wherein, in said second optical head, the tracking correction direction of the objective lens is set in the same direction as that of said reference radial line.

5. A disk drive according to claim 4, wherein tracking correction in said second optical head is performed by a three-beam method, and tracking correction in said first optical head, in which the tracking correction direction is determined, is performed by a method other than the three-beam method.

* * * * *